C. V. PEREDA.
MULTIPLE SEED AND FERTILIZER DRILL.
APPLICATION FILED NOV. 23, 1917. RENEWED NOV. 23, 1918.
1,302,428.
Patented Apr. 29, 1919.
2 SHEETS—SHEET 1.
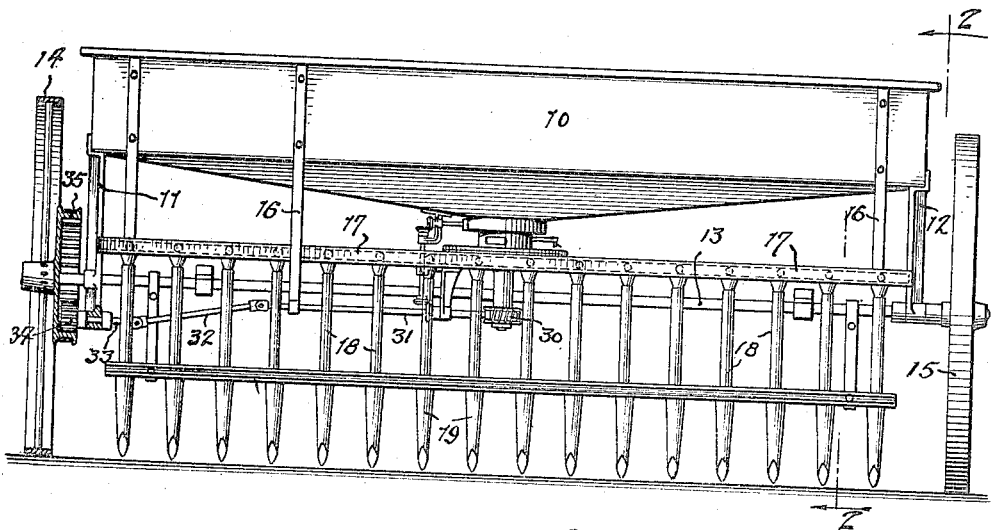
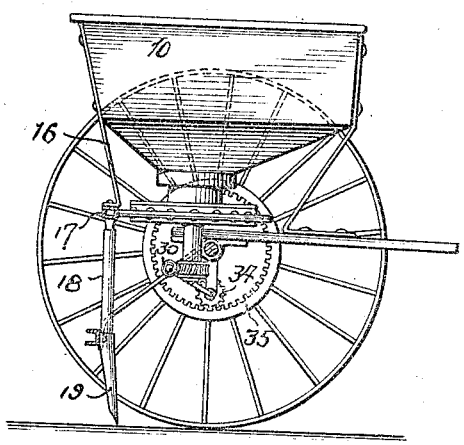
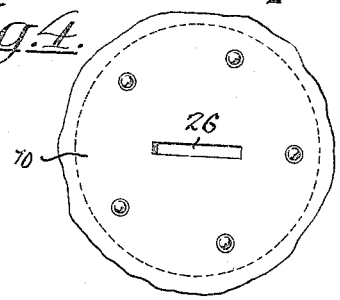
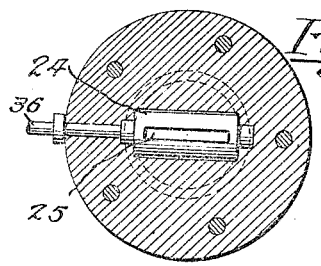
Inventor
CELEDONIO V. PEREDA
by his Attorneys
Howson and Howson

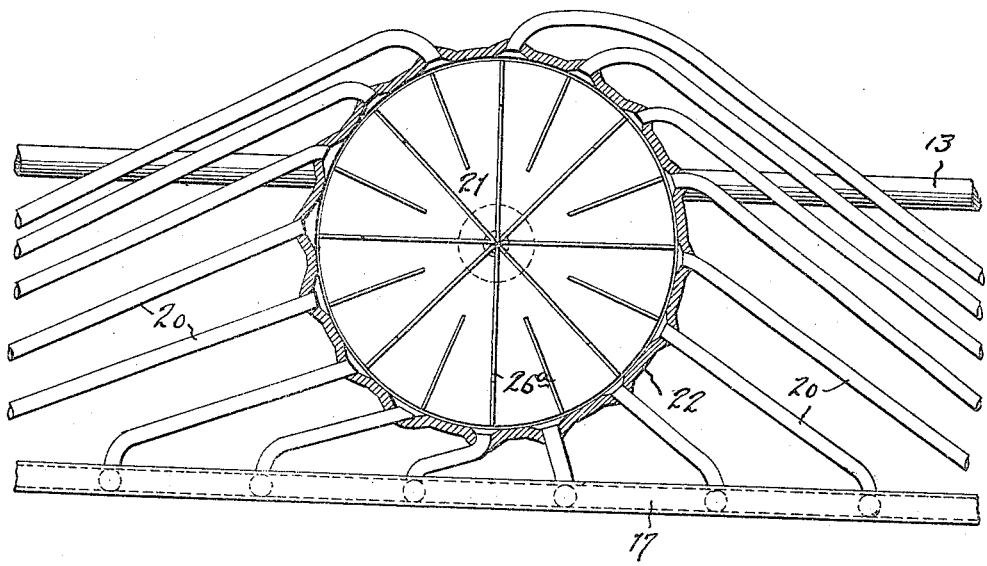
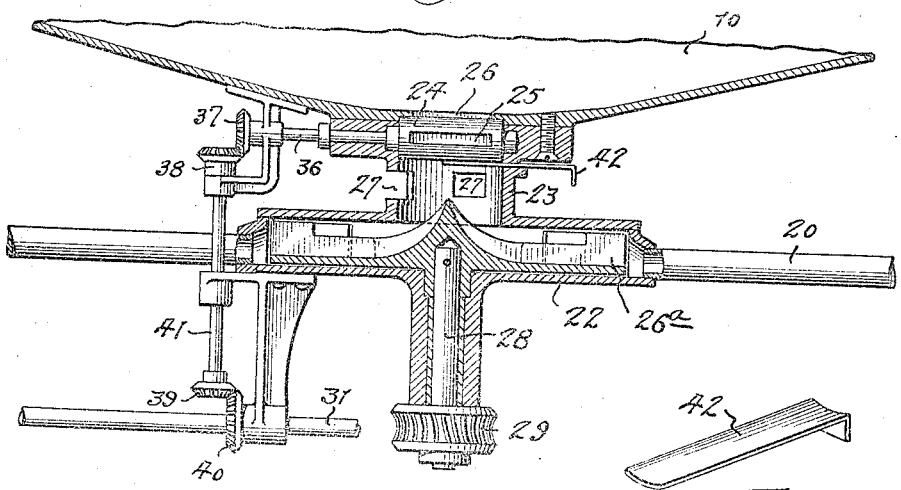

UNITED STATES PATENT OFFICE.

CELEDONIO V. PEREDA, OF BUENOS AIRES, ARGENTINA.

MULTIPLE SEED AND FERTILIZER DRILL.

1,302,428.  Specification of Letters Patent.  Patented Apr. 29, 1919.

Application filed November 23, 1917, Serial No. 203,577. Renewed November 23, 1918. Serial No. 263,938.

*To all whom it may concern:*

Be it known that I, CELEDONIO V. PEREDA, a citizen of the Republic of Argentina, residing in Buenos Aires, Argentina, and having a post-office address at 371 Tacuari street, Buenos Aires, Argentina, have invented certain new and useful Improvements in Multiple Seed and Fertilizer Drills, of which the following is a specification.

My invention relates to multiple seed and fertilizer drills and particularly to an improved distributer for feeding the material from the hopper to the drills.

In the accompanying drawings,

Figure 1 is a rear elevation of a drill in which my invention is embodied in one form;

Fig. 2 is a vertical section on the line 2—2, Fig. 1;

Fig. 3 is a horizontal section through the feed valve plate;

Fig. 4 is a partial plan of the hopper bottom showing port which communicates with the valve;

Fig. 5 is a plan of the centrifugal distributer; and

Fig. 6 is a vertical section through the feed and distributer mechanism.

Fig. 7 is a detail view of the feed regulating slide plate.

In the multiple drills now commonly used, the feed from the hopper to the drills is ordinarily controlled by a series of valves, one for each passage leading from the hopper to each of the drills. In a multiple drill which plants from fifteen to twenty rows at a time, a corresponding number of valve mechanisms must be provided. These are apt to become disarranged and thus interrupt the use of the drill or to cause it to work with irregularity. According to my invention, the feed to the several drill hoes is controlled by a single valve associated with a centrifugal distributer, which also serves as a fan for assisting the passage of the material through the several feed pipes leading to the drill hoes.

The hopper 10 is carried as usual by side standards 11 and 12 resting on the axle 13 of the supporting wheels 14 and 15. To brackets 16 at the rear of the hopper is attached a rail 17, from which depend pipes 18 opening to the drill hoes 19. Leading to each vertical pipe 18 is a separate feed pipe 20, (Fig. 5), the inner ends of which are here shown grouped around the periphery of a combined centrifugal distributer and blower fan 21. This fan is mounted in the casing 22, secured beneath the mid portion of the hopper 10 and communicating therewith through the throat 23. At the upper end of the throat is arranged a cylindrical control valve 24 provided with a series of oblong feed pockets 25. These communicate with the material in the hopper 10 through the slot 26 in the bottom thereof, so that as the valve rotates, the fertilizer or seed is admitted in measured quantity from the hopper to the centrifugal distributer 21. The latter rotates at high speed, and the seed or fertilizer falling through throat 23 is engaged by the blades 26$^a$ and thrown outward by centrifugal force into the feed pipes 20, the coned mouths of which are grouped around the periphery of the fan. The air blast from the fan forces the seed through the pipes 20, a sufficient supply of air to fulfil the requirements of the apparatus in this respect being taken in by the fan through the ports 27 in the throat 23.

The drive of the fan and valve may be accomplished in any suitable fashion. I have here shown the parts rotating at different speeds, since it is desirable that the fan should rotate more rapidly than the valve disk. The fan is fast with the spindle 28 carrying worm wheel 29 at its lower end, which meshes with worm 30 on shaft 31, connected by link 32 to spindle 33, the pinion 34 on which meshes with an internally toothed drum 35 on wheel 14. The valve 24 is fast with spindle 36, rotated through bevel gears 37—38, 39—40 and spindle 41 from shaft 31.

The amount fed by the valve 24 may be regulated in any suitable way, as by a slide plate 42, which more or less obturate the feed pockets 25.

The construction employed is much simpler and lighter than the ordinary construction using multiple valves. Moreover, a single centrifugal distributer construction may be made standard for all drills irrespective of the number of the feed hoes. The machine is capable of drilling any class of seed or fertilizer, it being necessary only to regulate the size of the opening in the rotary valve through the slide 42. The construction is inexpensive, free from danger of disarrangement, and is subject to less wear and tear than the usual apparatus. By making the feed pipes 20 of flexible material or suitable telescopic construction, it would be possible to alter their relative positions so as to accommodate the feed to drill hoes which are adjustably spaced apart for different widths of drill rows.

Various modifications of construction and arrangement of parts will readily occur to those skilled in the art which do not depart from what I claim as my invention.

I claim:—

1. A multiple drilling machine having a plurality of drill tubes, a hopper, a distributing chamber in communication with the hopper, a series of conducting passages opening at one end to said distributing chamber and at their other ends to the drill tubes, and in said chamber a centrifugal fan distributer to the blades of which the material from the hopper is delivered and by which said material is discharged to and propelled through said conducting passages to the drill tubes.

2. In a construction such as that specified in claim 1, a valve controlling the feed from the hopper to the centrifugal distributer.

3. In a construction such as that specified in claim 1, a rotary valve controlling the feed from the hopper to the centrifugal distributer.

4. In a construction such as that specified in claim 1, a rotary valve controlling the feed from the hopper to the centrifugal distributer, together with a coöperating cut-off slide for regulating the valve opening.

5. In a construction such as that specified in claim 1, air admission ports between the hopper and distributing chamber, through which ports air may enter the chamber and be blown by the fan through the conducting passages to assist in the propulsion of the material from the hopper through the passages.

6. In a construction such as that specified in claim 1, flared mouths for the conducting passages opening to the distributing chamber, by which the entry of the material into the passages from the centrifugal distributer is facilitated.

7. A multiple drilling machine having a line of substantially vertical drill tubes, a hopper, a substantially circular distributing chamber in communication with the hopper, a series of conducting passages opening at one end to said chamber and disposed around its periphery and at their other ends to the drill tubes, and a centrifugal fan distributer for feeding and propelling through said passages the material from the hopper.

In testimony whereof I have signed my name to this specification.

CELEDONIO V. PEREDA.

Copies of this patent may be obtained for five cents each, by addressing the "Commissioner of Patents, Washington, D. C."